(12) United States Patent
Minegishi et al.

(10) Patent No.: US 6,443,868 B1
(45) Date of Patent: Sep. 3, 2002

(54) FRICTIONAL PLANETARY ROLLER MECHANISM AND BRAKE

(75) Inventors: Kiyoji Minegishi, Aichi; Jun Tamenaga, Ohbu, both of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 44 days.

(21) Appl. No.: 09/716,437

(22) Filed: Nov. 21, 2000

(30) Foreign Application Priority Data

Dec. 3, 1999 (JP) ............................................ 11-344887
Dec. 3, 1999 (JP) ............................................ 11-344888
Dec. 3, 1999 (JP) ............................................ 11-345243

(51) Int. Cl.[7] ............................................... F16H 48/06
(52) U.S. Cl. ......................... 475/149; 475/183; 310/83; 310/103
(58) Field of Search ................................. 475/154, 149, 475/183; 310/77, 83, 93, 103

(56) References Cited

U.S. PATENT DOCUMENTS 1,871,835 A * 8/1932 Batchelder
2,268,305 A * 12/1941 Reinhard
3,141,662 A * 7/1964 Wise
3,433,099 A * 3/1969 Nasvytis

* cited by examiner

*Primary Examiner*—Dirk Wright
(74) *Attorney, Agent, or Firm*—Arent Fox Kintner Plotkin & Kahn (57) ABSTRACT

A frictional transmission apparatus comprising a simple planetary roller mechanism and a brake mechanism, the simple planetary roller mechanism having friction rollers including a sun roller, a planetary roller, and a ring roller. Static friction torque Y obtainable from the brake mechanism is set to fall within the range of $0.1Xd<Y<0.7Xd$, where Xd is the value of test torque at which any of the friction rollers starts to make sliding rotations when the test torque is input in gradually increasing values to the sun roller with a carrier and the ring roller fixed stationary. Besides, a squeezing force from the ring roller is set so that Xd, critical test torque, falls within the range of 1.4–10.0 times static friction torque Y of the brake mechanism. The static friction torque Y and the critical test torque Xd are otherwise set to satisfy $Y<Xd$, as well as dynamic friction torque Ys obtainable from the brake mechanism at a rated revolution speed and limit transmission toque Xs of the simple planetary roller mechanism with the sun roller rotating at the rated revolution speed are set to satisfy $0.65Ys<Xs<3.4Ys$.

7 Claims, 9 Drawing Sheets

FRICTIONAL PLANETARY ROLLER MECHANISM AND BRAKE

BACKGROUND OF THE INVENTION

1. Field of the Invention

The invention relates to a frictional transmission (or tractional) apparatus which comprises a simple planetary roller mechanism having friction (or traction) rollers including a sun roller, a planetary roller (or rollers), and a ring roller, and a brake mechanism for braking rotation of these friction rollers. The invention also relates to a frictional transmission type rotational driving apparatus having the frictional transmission apparatus and a motor in combination, a series of the same, and a method of fabricating the frictional transmission apparatus.

2. Description of the Related Art

Conventionally, frictional transmission apparatuses comprising a simple planetary roller mechanism are known widely.

Figure 8:
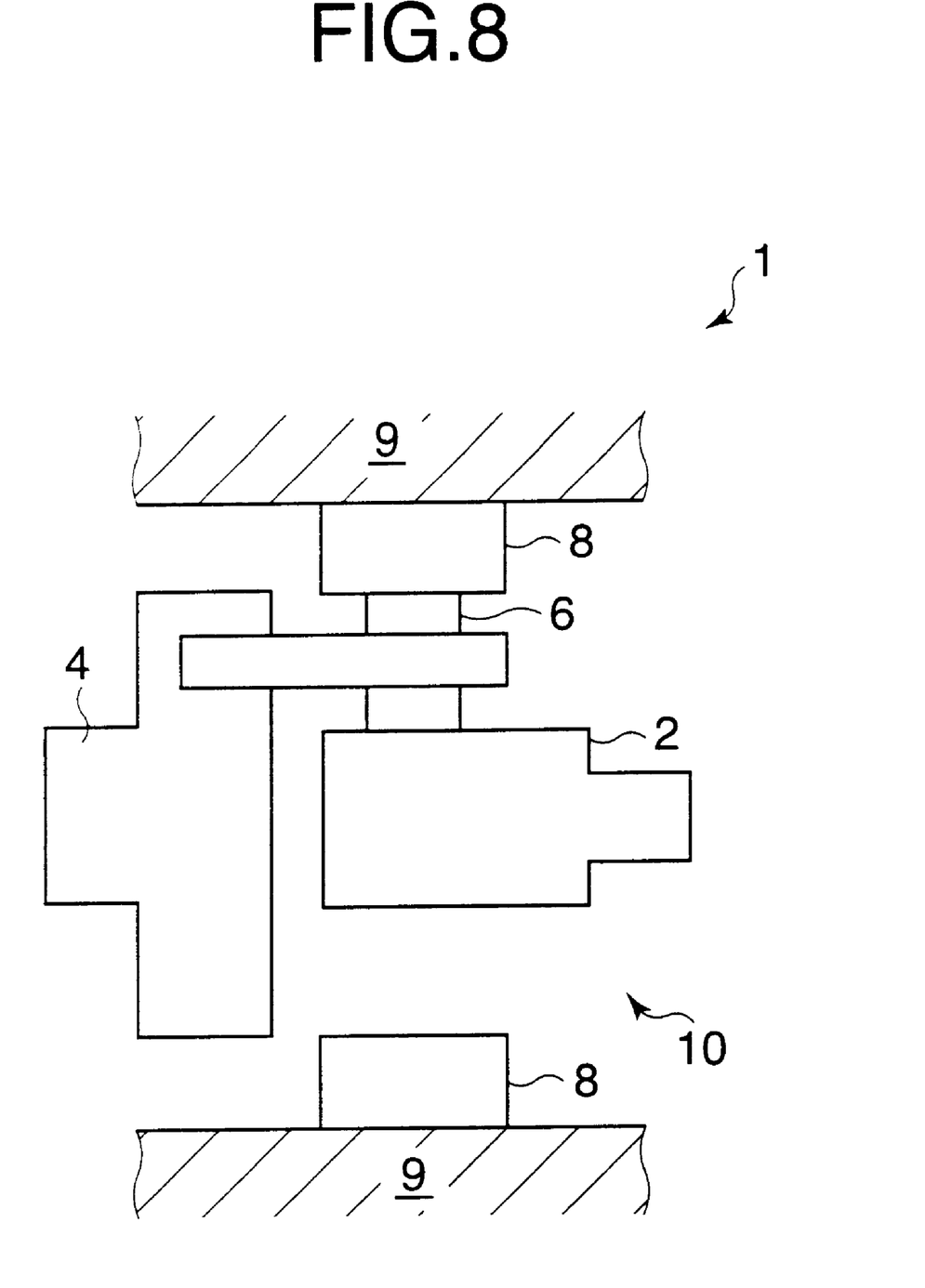
FIG. 8 is a conceptual diagram showing a conventional, typical frictional transmission apparatus.

FIG. 8 schematically shows an example of such a conventional frictional transmission apparatus. This frictional transmission apparatus 1 comprises a simple planetary roller mechanism 10 arranged in an outer casing 9 (general view omitted). The simple planetary roller mechanism 10 has friction rollers including a sun roller 2, a planetary roller 6, and a ring roller 8. The planetary roller 6 makes rolling contact with the outer periphery of the sun roller 2 and with the inner periphery of the ring roller 8. The ring roller 8 is restricted in its rotation. Besides, a supporting pin is inserted through the planetary roller 6 so as to couple a carrier 4 to this simple planetary roller mechanism 10.

In this frictional transmission apparatus 1, the sun roller 2 and the carrier 4 make input/output elements, and the ring roller 8 a fixed element. Making the input element out of the sun roller 2 provides a speed reducing function, and making the output element out of the sun roller 2 a speed increasing function. Here, the ring roller 8 is fixed onto the part of the outer casing 9.

Figure 9:
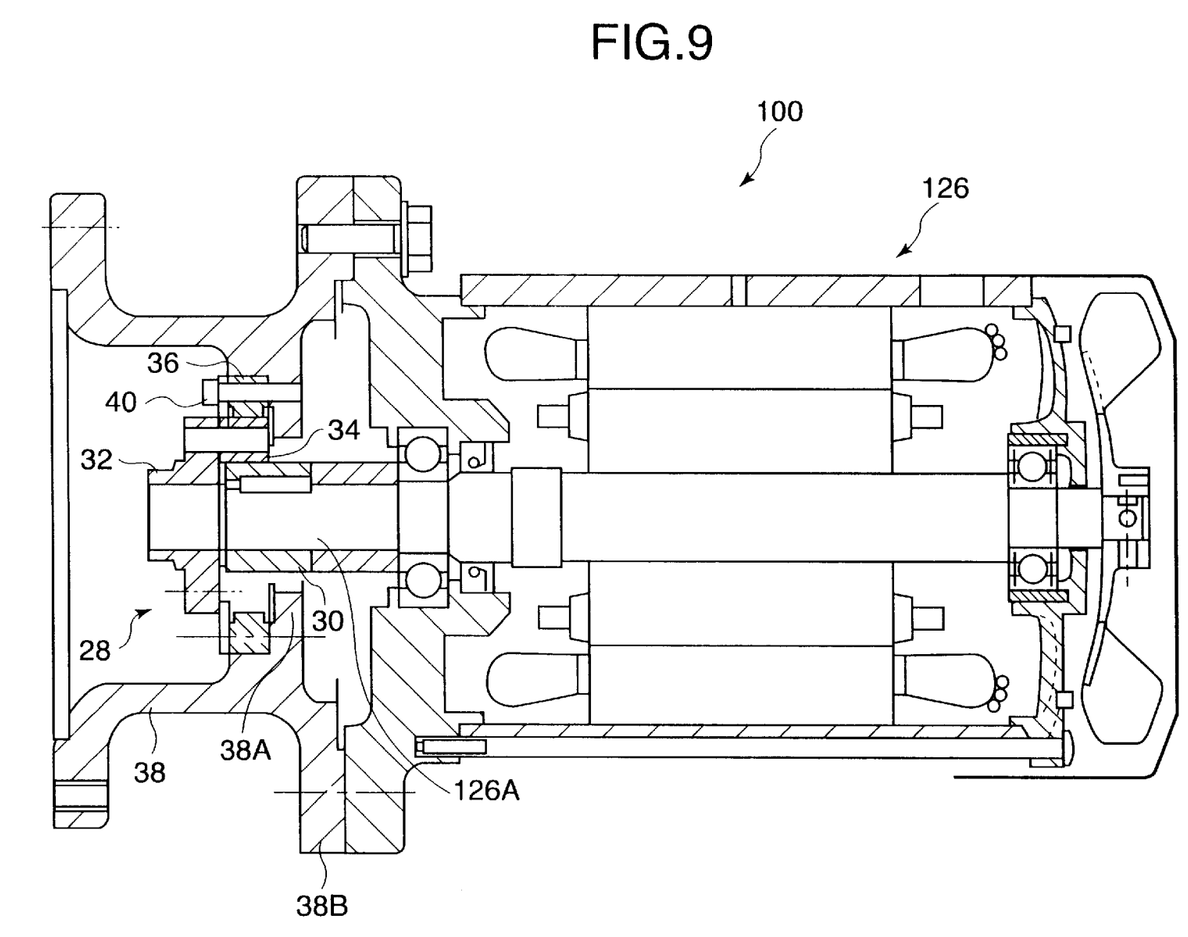
FIG. 9 is a schematic view showing a concrete friction transmission type rotational driving apparatus.

FIG. 9 shows the embodiment of the structure in FIG. 8, or a rotational driving apparatus 100 of frictional transmission type devised by the present inventors (not yet known publicly as of this point of application). This rotational driving apparatus 100 comprises a simple planetary roller mechanism 28 and a motor 126. The simple planetary roller mechanism 28 has friction rollers consisting of a sun roller 30, a planetary roller (or rollers) 34, and a ring roller 36. The planetary roller 34 is retained by a carrier 32, and makes rolling contact with the outer periphery of the sun roller 30 and with the inner periphery of the ring roller 36. The ring roller 36 is restricted in its rotation. The motor 126 is coupled to the sun roller 30 to drive this sun roller 30.

Specifically, a motor shaft 126A of the motor 126 is coupled to the sun roller 30 via a parallel key. The motor 126 itself is fixed to a flange portion 38B of a casing 38 which accommodates the simple planetary roller mechanism 28.

This casing 38 has a ring-shaped fixing portion 38A projected radially inward from its inner-peripheral side. The ring roller 36 is fixed to this fixing portion 38A by a bolt 40.

In the simple planetary roller mechanism 28, the sun roller 30 makes an input element, the carrier 32 an output element, and the ring roller 36 a fixed element. The entire mechanism thus has a speed reducing function. That is, this rotational driving apparatus 100 has a structure of transmitting rotational power of the motor 126 to the sun roller 30 and outputting the same from the part of the carrier 32 with a predetermined reduction ratio.

The simple planetary roller mechanism 28 transmits the rotational power from the motor 126 by means of frictional forces or oil shearing forces (tractional forces) occurring between the respective contact surfaces of the friction rollers (tractional transmission). This allows smoother, quieter operation as compared with geared and other transmission structures.

Accordingly, in order to secure a predetermined transmission capability (transmittable torque) from the simple planetary roller mechanism 28, sufficient frictional forces need to be produced between the individual friction rollers. The frictional forces are generally given by making the inside diameter of the ring roller 36 smaller than the sum of twice the diameter of the planetary roller 34 and the diameter of the sun roller 30, i.e., applying a squeezing force to the ring roller 36 for elastic deformation. The larger the squeezing force, the larger the frictional forces between the friction rollers become, and these frictional forces in turn increase the transmittable torque of the simple planetary roller mechanism 28. In contrast, smaller squeezing forces lower the transmittable torque. Incidentally, when the transmittable torque is higher (the squeezing forces are larger), the individual friction rollers increase in rotational resistance. This can lower the transmission efficiency of the rotational driving apparatus 100 and produce a low-durability problem of the simple planetary roller mechanism 28 due to rolling fatigue.

The rotational driving apparatus 100 mainly receives two merits from the adoption of the above-described simple planetary roller mechanism 28. First, as stated already, power transmission can be performed more smoothly and quietly than in geared and other transmission structures. The result is that the efficiency of the rotational power transmission is enhanced to suppress the power consumption of the motor 126, contributing to so-called "energy saving." Second, since the friction rollers are relatively easy to fabricate as compared with gears and the like, the fabrication costs are reduced to make the entire rotational driving apparatus 100 "low-priced."

Meanwhile, the adoption of this frictional transmission type simple planetary roller mechanism 28 brings about the following demerit. That is, due to the structure of transmitting rotational power by means of frictional forces, the respective contact surfaces of the rotating friction rollers always bear some slight slips therebetween. This precludes a "strict" reduction ratio being maintained between the revolution speed of the sun roller 30 and the revolution speed of the carrier 32 all the time. Therefore, as long as this point is concerned, geared and other transmission structures are superior.

Considering actual use situations of such a motor in a reduction mechanism (rotational driving apparatus), however, the induction motor adopted involves a certain slip between its rotor and rotating field in the first place. Therefore, a strict reduction ratio need not be required of the reduction mechanism itself. That is, maintaining a coupled mating machine at a predetermined revolution speed typically requires measuring the mating machine or the like for revolution speed and performing feedback control onto the motor. Thus, "energy-saving" and "low-priced" simple planetary roller mechanisms better fit the current market needs than geared reduction mechanisms which are expensive through strict in reduction ratio.

Conventionally, there are many gear transmission type rotational driving apparatuses (so-called geared motors) with a brake mechanism added to their motor and the like.

To the present inventors' knowledge, however, neither a frictional transmission type rotational driving apparatus with a brake mechanism exists on the market, nor a proposal to add a brake mechanism has been made under current conditions. The reason for this seems that there actually exist a number of difficulties as follows.

To be more specific, frictional transmission apparatuses with a simple planetary roller mechanism transmit power by means of frictional forces occurring between the respective contact surfaces of their friction rollers, and therefore a large rotational load applied thereto can easily produces a "slip" on the contact surfaces. Meanwhile, brake mechanisms in common use convert kinetic energy into thermal energy by means of friction between their brake ring and brake shoes. In other words, the braking forces are produced from a "slip" between the brake ring and brake shoes.

Since frictional transmission apparatuses and brake mechanisms both involve potential slips, optimum combinations thereof are hard to find. Moreover, in a sense, even a lot of experience and skill cannot always ensure optimum braking characteristics for a simple planetary roller mechanism to be obtained from brake mechanisms.

For example, when braking torque obtainable from a brake mechanism is too low, it is impossible to brake a frictional transmission apparatus or a mating machine (load) coupled thereto with reliability. Therefore, the obtainable braking torque (braking capability) needs to be set considerably higher for safety. Too high braking torque, however, not only makes the brake mechanism's power excessively high (in relation to required power) to cause a needless increase in costs,-but also leads to a hard brake, which gives rise to a problem that it becomes impossible for the friction surfaces of the individual rollers in the frictional transmission apparatus to hold the inertial force (reaction) from the mating-machine (load) side. That is, the frictional transmission apparatus can possibly produce a slip because of too high braking torque although proper braking would be possible if the braking torque were adequate and the braking were made at appropriate speed. Once a slip occurs, needless to say, it becomes difficult to apply a brake on the frictional transmission apparatus.

Accordingly, the difficulty in this type of design lies in that simply upsizing the brake mechanism for the sake of safety is not sufficient.

What complicates the designing more is the fact that the transmittable torque (maximum transmission torque) of a frictional transmission apparatus depends on the amount of interference and the like, and the transmittable torque can vary considerably with even a slight deviation of the actual interference from an interference design because of product variations.

This means too many uncertainties or unclear factors in combining a brake mechanism with a frictional transmission apparatus. Therefore, the development up to a "product" requires efforts of making a number of prototypes and conducting test runs for every possible situation so as to bring the transmission capability of a frictional transmission apparatus and the braking capability of a brake mechanism into optimum range of balance.

Furthermore, when a company introduces to the market this type of frictional transmission apparatus with a brake mechanism as its "product", the introduction typically needs to involve apparatuses of various transmission capacities or various reduction ratios in a series (product group). Here, unless certain methods of designing and fabrication are developed, it is close to impossible to construct the series with overall consistency (merely by trial and error on each model).

These circumstances add up to a cost disadvantage as compared with the construction of a series from those products including gear mechanisms or other power transmission apparatuses and built-in brake mechanisms. This cost disadvantage seems to be the reason why there has been no product of a frictional transmission apparatus with a built-in brake mechanism. This is because it is generally more reliable and less expensive to use gear mechanisms with known characteristics (with no slip) rather than to use roller mechanisms one or two ranks greater than required sizes.

Nevertheless, frictional transmission apparatuses still have excellent properties such as quietness and coaxiality, and many advantages of having compact configuration, being relatively higher in reduction ratios, being easy to obtain an arbitrary value of reduction ratio, and the like.

SUMMARY OF THE INVENTION

The present invention has been achieved in view of the foregoing, and an object thereof is to provide a frictional (or tractional) transmission apparatus which comprises a brake mechanism having substantially optimum braking characteristics with respect to its simple planetary roller mechanism, and a method of fabricating the same. Another object of the present invention is to provide a frictional transmission type rotational driving apparatus having the frictional transmission apparatus and a motor in combination, and a series of the same.

The foregoing objects of the present invention has been achieved by the provision of a frictional transmission apparatus comprising a simple planetary roller mechanism and a brake mechanism, the simple planetary roller mechanism having friction (or traction) rollers including a sun roller, a planetary roller (or rollers), and a ring roller, the planetary roller being retained by a carrier and making rolling contact with the outer periphery of the sun roller and with the inner periphery of the ring roller, the brake mechanism being coupled to the sun roller to brake rotation of this sun roller. Here, static friction torque Y obtainable from the brake mechanism is set to fall within the range of $0.1Xd<Y<0.7Xd$, where Xd is critical test torque, a value of test torque at which any of the friction rollers starts to make sliding rotation when the test torque is input in gradually increasing values to the sun roller with the carrier and the ring roller fixed stationary.

The present inventors have first decided to introduce the following structure it a frictional transmission apparatus. That is, a sun roller makes an input element and either a carrier or a ring roller makes an output element to exercise a speed reducing function, and a brake mechanism coupled to the sun roller applies a brake on the rotation of an external load (mating machine) coupled to the carrier or ring-roller side. The reason is that this structure maintains coaxiality between the input and output shafts, is excellent in quietness, can achieve higher reduction ratios with compact configuration, and has high versatility as a most typical structure for frictional transmission apparatuses.

Now, due to its high versatility, this frictional transmission apparatus finds a great variety of uses, and can be used with various mating machines. Accordingly, the frictional transmission apparatus needs to combine a brake mechanism whose characteristics are most appropriate under various possible situations. On this account, the present inventors have decided to create virtual situations in which the simple planetary roller mechanism undergoes braking. To be more specific, suppose here that the sun roller is completely fixed by a brake mechanism, and a mating machine (external load) coupled to the carrier or the ring-roller side is maintained stationary by that brake mechanism via the simple planetary roller mechanism. Reaction torque occurring on the brake-mechanism side from the rotational power of the mating machine itself (produced by an inertial force, its own weight, and the like) then corresponds to the torque obtained by the brake mechanism. The present inventors have found that this reaction torque can be utilized to bring the transmission capability of the simple planetary roller mechanism and the braking capability of the brake mechanism into optimum balance. That is, in the present invention, this reaction torque is gradually increased in terms of "test torque" application to the sun roller so that it is watched for the value (hereinafter, referred to as critical test torque Xd) actually applied at the instant when any of the friction rollers starts to make sliding rotation resultingly.

These situations, of course, will not match all the situations in which the braking torque from the brake mechanism actually puts a brake on a mating machine via the frictional transmission apparatus. However, a great number of check tests have produced the following finding. When the static friction torque Y from a brake mechanism is set to fall within the range obtained by multiplying the critical test torque Xd by predetermined factors ($0.1Xd<Y<0.7Xd$; and favorably $0.2Xd<Y<0.5Xd$), it is possible to set the brake mechanism appropriately while assuming actual use situations with high reproducibility in the cases of connection with various loads and with various drive sources (e.g., a motor).

More specifically, when the static friction torque Y from the brake mechanism is set in the above-mentioned range with respect to the critical test torque Xd, it is possible to avoid almost all such situations that the capability of the brake mechanism is so high as to cause a so-called hard brake under which "the simple planetary roller mechanism starts to slip before the limit of the braking capability ensured by the brake mechanism is reached."

That setting can also preclude almost all "braking failures" even when the driving capability (driving torque) of a drive source is so high that it practically reaches the limit of the frictional transmission apparatus.

In the frictional transmission apparatus comprising a brake mechanism set as described above, a motor having a motor shaft consisting of a coupling shaft for coupling the sun roller and the brake mechanism may be installed around the coupling shaft so that rotational power from the motor is transmitted to the coupling shaft. This constitutes a frictional transmission type rotational driving apparatus.

Moreover, a plurality of frictional transmission type rotational driving apparatuses fabricated on the basis of this design concept, differing from each other in transmission capacity and in speed change ratio may form a series of frictional transmission type rotational driving apparatuses.

Now, the above-described theory devised by the present inventors has also resulted in a specific method of fabricating the frictional transmission apparatus described above.

To be more specific, test torque is initially input in gradually increasing values to the sun roller with the carrier and the ring roller fixed stationary, and the test torque is measured for the value (critical test torque) Xd at which any of the friction rollers starts to make sliding rotation.

Next, the braking portion of the brake mechanism is set and fabricated so that its static friction torque Y falls within the range of $0.1Xd<Y<0.7Xd$ (favorably $0.2Xd<Y<0.5Xd$) with respect to the critical test torque Xd measured.

According to the method of fabricating a frictional transmission apparatus comprising the foregoing two steps, it is possible to obtain an optimum combination of a simple planetary roller mechanism and a brake mechanism, allowing the fabrication of a frictional transmission apparatus with ensured braking capability and excellent cost performance. This is ascribable to the fact that not only the design theory but also the concept of virtually created use situations (braking situations) is introduced to the fabrication processes of the frictional transmission apparatus.

In this connection, the simple planetary roller mechanism described above generally has power transmission modes involving the fixed-input-output relationships as follows:

1) With the sun roller as the input element, the ring roller makes the fixed element and the carrier retaining the planetary roller the output element, or the ring roller makes the output element and the carrier retaining the planetary roller the fixed element;

2) With the carrier retaining the planetary roller as the input element, the ring roller makes the fixed element and the sun roller the output element, or the ring roller makes the output element and the sun roller the fixed element; and 3) With the ring roller as the input element, the carrier retaining the planetary roller makes the fixed element and the sun roller the output element, or the carrier retaining the planetary roller makes the output element and the sun roller the fixed element.

The simple planetary roller mechanism in the present invention adopts the mode (1) mentioned above. The present invention is applicable with either of the ring roller and the carrier as the output element.

By the way, the present inventors have introduced the new concept of "test torque input" to the method of fabricating a frictional transmission apparatus, as mentioned above. The test torque is directly input to a real (actual) simple planetary roller mechanism, and the resultant data are not of theoretical values. The introduction thereof to the fabrication processes thus makes it possible to overcome even in-process variations, so as to ensure the fabrication of a frictional transmission apparatus in optimum balance.

In a second aspect, the present invention achieves the foregoing objects by the provision of a method of fabricating a frictional (or tractional) transmission apparatus comprising: a simple planetary roller mechanism having friction (or traction) rollers including a sun roller, a planetary roller (or rollers), and a ring roller, the planetary roller being retained by a carrier and making rolling contact with the outer periphery of the sun roller and with the inner periphery of the ring roller, the ring roller applying a squeezing force to the planetary roller and the sun roller; and a brake mechanism coupled to the sun roller to brake rotation of the sun roller. Here, the squeezing force from the ring roller is set so that critical test torque falls within the range of 1.4–10.0 times static friction torque obtainable from the brake mechanism, where the critical test torque is a measurement of test torque at which any of the friction rollers starts to make sliding rotation when the test torque is input in gradually increasing values to the sun roller with the carrier and the ring roller fixed stationary.

Specifically, the actual data collection based on the "test torque input" is conducted in a manner as follow:

Initially, test torque is input in gradually increasing values to the sun roller with the carrier and the ring roller fixed stationary. Then, at first, frictional forces arising among the friction rollers produce reaction torque so that the test torque keeps increasing while the individual friction rollers are stationary. When the reaction torque produced by the frictional forces reaches its limit, one of the friction rollers makes sliding rotation so that the reaction torque drops suddenly. The value of the test torque having been actually applied until the reaction torque drops suddenly is grasped as the above-mentioned "critical test torque."

As stated previously, the mode of detecting the "critical test torque" will not match every situation in which the braking torque from the brake mechanism actually puts a brake on a mating machine via the frictional transmission apparatus. Nevertheless, the present inventors have found through many check tests that multiplying this value by certain factors can provide indexes even effective for static friction torque from the brake mechanism. More specifically, the present inventors have found through a number of check tests that as long as the critical-test torque falls within the range of 1.4–10.0 times the static friction torque from the brake mechanism, this versatile frictional transmission apparatus is well applicable to almost any use mode while securing high-efficient transmission capability and braking capability. It is this finding that has led to the contrivance of the second aspect of the present invention.

To be more specific, a frictional transmission apparatus fabricated through the foregoing fabrication steps has critical test torque that falls within the range mentioned above. This means a frictional transmission apparatus with the braking capability of its brake mechanism and the transmission capability (may also be considered as retaining capability, in this case) of its simple planetary roller mechanism in balance. For example, it is possible to prevent the simple planetary roller mechanism from being relatively too small in transmission capability with respect to the braking capability of the brake mechanism. This can avoid such cases that the brake-mechanism side exerts sufficient braking torque while too small transmission capacity causes a slip in the simple planetary roller mechanism to preclude the braking torque being transmitted to a mating machine with reliability. Besides, it is possible to prevent the simple planetary roller mechanism from being so high in transmission capability (so high in rotational resistance) with respect to the brake mechanism as to produce a great (unnecessary) energy loss. Moreover, the durability of the simple planetary roller mechanism can also be prevented from dropping excessively.

As a consequence, according to this fabrication method, a frictional transmission apparatus for transmitting power to a mating machine with reliability can be obtained. Moreover, it is possible to conduct power transmission performance tests and braking performance tests on an in-fabrication frictional transmission apparatus after their systematization into a manual. Therefore, in-fabrication and design errors are prevented for a large reduction in fabrication costs, as compared with the cases where frictional transmission apparatuses are fabricated based on experience and skill before they are measured for power capacity and the like on every possible situation.

In the method of fabricating a frictional transmission apparatus described above, the critical test torque is more favorably set to fall within the range of 2.0–5.0 times the static friction torque from the brake mechanism.

Furthermore, in a third aspect, the present invention achieves the foregoing objects by the provision of a frictional (or tractional) transmission type rotational driving apparatus comprising a simple planetary roller mechanism and a motor, the simple planetary roller mechanism having friction (or traction) rollers including a sun roller, a planetary roller, and a ring roller, the planetary roller being retained by a carrier and making rolling contact with the outer periphery of the sun roller and with the inner periphery of the ring roller, the motor being coupled to the sun roller to drive the sun roller. A brake mechanism is added to the motor. Here, $Y<Xd$ holds, where Y is static friction torque obtainable from the brake mechanism, and Xd is a value of test torque (critical test torque) at which any of the friction rollers starts to make a slip when the test torque is input in gradually increasing values to the sun roller with the carrier and the ring roller fixed stationary. In addition, $0.65Ys<Xs<3.4Ys$ holds, where Ys is dynamic friction torque obtainable from the brake mechanism at a rated revolution speed of the motor, and Xs is limit transmission torque transmittable by the simple planetary roller mechanism through the sun roller when this sun roller is rotated at the rated revolution speed.

As mentioned previously, the present inventors, in adding a brake mechanism to a frictional transmission type rotational driving apparatus having a simple planetary roller mechanism and a motor in combination, have given consideration to possible situations for the actual use of the rotational driving apparatus. This third aspect of the present invention focuses on a difference between the braking states at rest and at revolutions.

The gist of the invention in this third aspect is as follows:

Simple planetary roller mechanisms transmit power by means of frictional forces (or oil shearing forces: traction forces) arising between the respective contact surfaces of their friction (or traction) rollers, and thus produce a "slip" on the contact surfaces when subjected to a heavy rotational load. Meanwhile, brake mechanisms in common use convert kinetic energy into thermal energy also by means of friction caused by squeezing brake rings with their brake shoes. In other words, brake mechanisms generate braking power through a "slip" between their brake rings and brake shoes.

Since both frictional transmission apparatuses and brake mechanisms involve potential slips, it is difficult to find optimum combinations thereof in terms of sure braking. Therefore, in actual designing and fabrication heretofore, the safety to include such uncertain factors requires to set somewhat higher to set the simple planetary roller mechanisms greater in transmittable torque which depends on squeezing force.

The reason for this is that it has been considered impossible to put a sure brake on a mating machine (external load) coupled to a rotational driving machine when, for example, the simple planetary roller mechanism is too low in transmission capability (transmittable torque) with respect to the braking capability of the brake mechanism (the braking torque occurring in the braking).

On the other hand, simple planetary roller mechanisms need to transmit rotational driving power from a motor with high efficiency.

That is, when a simple planetary roller mechanism is designed and fabricated in greater dimensions (including transmission capability), the friction rollers thereof increase in rotational resistance, losing the merit of "transmitting rotational power with high efficiency" inherent in frictional transmission type simple planetary roller mechanisms. This also entails an increase in costs. Therefore, in terms of transmission efficiency and costs, simple planetary roller mechanisms must be designed as small as possible (including in transmission capability).

It seems these conflicting factors that have precluded brake mechanisms being easily added to frictional transmission type rotational driving apparatuses so that the adoption of brake mechanisms has finally been abandoned. This is ascribable to the general circumstances in this industry that using gear mechanisms, as mentioned before, consequently allows surer and less expensive fabrication rather than using roller mechanisms one or two ranks greater than required sizes.

The third aspect of the present invention has been achieved in view of the foregoing problems, and an object thereof is to combine a simple planetary roller mechanism, a motor, and a brake mechanism in optimum balance so as to provide a high cost-performance frictional transmission type rotational driving apparatus in which the braking capability is maintained while an increase in efficiency and a reduction on costs are achieved compatibly.

To describe the third aspect in more details, a typical brake mechanism, for example, sandwiches a brake ring with its brake shoes to exert braking power by means of frictional forces. For the brake mechanism to prevent the braking capacity from varying with revolution speeds, a relative difference between the static friction torque at rest (so-called retention torque) and the dynamic friction torque at revolutions is set to be as small as possible (the static friction torque being somewhat greater though). On the other hand, a simple planetary roller mechanism is not intended to produce a rotational load, but principally to make smooth rotations by applying a predetermined squeezing force to among the rollers. Accordingly, with respect to the transmission torque at rest (can also be called as retention torque), the transmission torque at revolutions may be "relatively" low in considerable measure.

Then, the present inventors have focused attention on the fact that brake mechanisms and simple planetary roller mechanisms greatly differ from each other in the relative difference between the respective transmission (braking) capabilities at rest and at revolutions. That is, to well utilize this contrast, a new concept of "limit transmission torque" which shows the transmission capability of a simple planetary roller mechanism at revolutions is introduced aside from the concept of "critical test torque Xd" which represents the transmission capability at rest. This makes it possible to bring a simple planetary roller mechanism, a brake mechanism, and a motor into optimum balance based on those numeric values measured on an actual simple planetary roller mechanism.

More specifically, the above-described critical test torque Xd and limit transmission torque Xs, and the braking torques (static friction torque and dynamic friction torque) of a brake mechanism are set in the above-mentioned relations in magnitude. According to a frictional transmission type rotational driving apparatus set thus, the static friction torque obtainable from the brake mechanism can be surely transmitted via the simple planetary roller mechanism to a coupled mating machine at rest, so as to retain the mating machine stationary with reliability. Besides, at revolutions, the dynamic friction torque produced by the brake mechanism can be "somewhat" surely transmitted to the mating machine via the simple planetary roller mechanism, so as to reduce the revolution speed of the mating machine with reliability.

That is, in terms of its functions, the brake mechanism must stop the mating machine with reliability at the end, while the brake at revolutions originally involves the brake mechanism itself braking and sliding as well. Therefore, the simple planetary roller mechanism need not transmit the braking force to the mating machine "completely," and may have its own potential for sliding. In other words, it is essential only that the rotational driving apparatus exerts predetermined braking power as far as the simple planetary roller mechanism can transmit, so as to lower the revolution speed of the mating machine with reliability. As the revolution speed on the mating-machine side gradually decreases, the limit transmission capability of the simple planetary roller mechanism increases gradually (has been verified by the inventors). Accordingly, it is possible to brake the mating machine without fail at the end, and the mating machine, once stopped, will not independently start to rotate.

Meanwhile, considering typical combinations of a motor and a brake mechanism, the constitution of the rotational driving apparatus according to the present invention has the optimum settings, for the transmission capability of the simple planetary roller mechanism, which is neither too great nor too small with respect to the driving capability of the motor at its rated revolution speed. That is, the sure braking functions as described above are exercised while sufficiently maintaining the properties of the frictional transmission type, namely, quiet and smooth transmission (high-efficient transmission) of rotational power.

As a consequence, according to the present invention, a high cost-performance rotational driving apparatus having three components, namely, a simple planetary roller mechanism, a brake mechanism, and a motor optimally set in capability balance is obtained.

In this rotational driving apparatus, the specific driving capability of the motor is preferably set as T<Xs, where Xs is the limit transmission torque of the simple planetary roller mechanism and T is the rated torque of the motor. This setting makes it possible, in terms of driving capability as well as braking capability, to drive a mating machine coupled to this frictional transmission type rotational driving apparatus with yet higher reliability.

In the above-described invention, the limit transmission torque Xs of the simple planetary roller mechanism is set to fall within $0.65Ys<Xs<3.4Ys$, whereas it is preferably set as $0.8Ys<Xs<1.7Ys$, and best set so that Ys and Xs nearly equal to each other.

The nature, principle, and utility of the invention will become more apparent from the following detailed description when read in conjunction with the accompanying drawings.

DETAILED DESCRIPTION OF THE PREFERRED EMBODIMENTS

Hereinafter, embodiments of the present invention will be described in detail with reference to the accompanying drawings.

Figure 1:
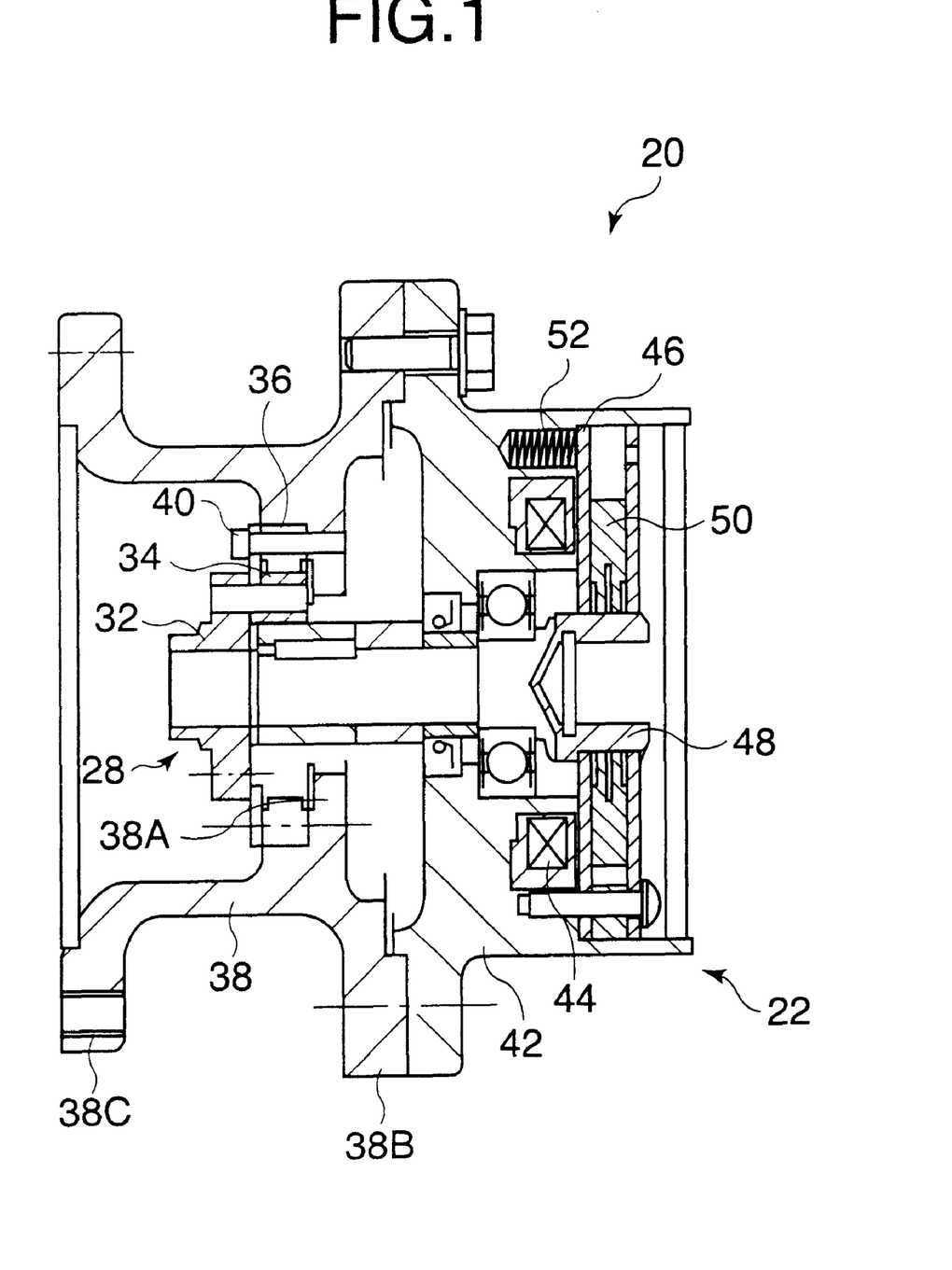
FIG. 1 is a partial sectional view of a frictional transmission apparatus according to a first embodiment of the present invention.

FIG. 1 is a partial sectional view showing a frictional transmission apparatus 20 according to an embodiment of the present invention. This frictional transmission apparatus comprises a simple planetary roller mechanism 28 and a brake mechanism 22. The simple planetary roller mechanism 28 has friction rollers consisting of a sun roller 30, a planetary roller 34, and a ring roller 36. The planetary roller 34 is retained by a carrier 32, and makes rolling contact with the outer periphery of the sun roller 30 and with the inner periphery of the ring roller 36. The ring roller 36 is restricted in its rotation. The brake mechanism 22 is coupled to the sun roller 30 to brake rotation of the sun roller 30.

The static friction torque Y obtainable from this brake mechanism should be set within the range of $0.1Xd<Y<0.7Xd$ and favorably within the range of $0.2Xd<Y<0.5Xd$, where Xd is critical test torque of the simple planetary roller mechanism 28 (to be detailed later). Specifically, the static friction torque Y is set at 0.3Xd.

The simple planetary roller mechanism 28 is accommodated in a casing 38. On the inner-peripheral side of this casing 38 is arranged a doughnut-shaped projection 38A, to which the ring roller 36 is fixed by a bolt 40.

This casing 38 has flange portions 38B and 38C radially extending outward at both sides along the direction of its center axis. A casing 42 of the brake mechanism 22 is integrally coupled to the flange portion 38B on the part of the sun roller 30. The brake mechanism comprises a ring-shaped exciting coil 44, a ring-shaped brake shoe 46, a brake ring 50, and a coil spring 52. The exciting coil 44 is arranged integrally on the casing 42. The brake shoe 46 is restricted in its circumferential rotations and capable of axial slides with resect to the casing 42. The brake ring 50 is coupled to the sun roller 30 via a coupling shaft 48, and makes integral rotations with the sun roller 30. The coil spring 52 keeps pressing the brake shoe 46 toward the brake ring 50.

The exciting coil 44, when energized, attracts the brake shoe 46 so that the brake shoe 46 is separated from the brake ring 50 against the pressing force from the coil spring 52 for a non-brake state. when the exciting coil 44 is not energized, the coil spring 52 presses the brake shoe 45 against the brake ring 50 for a brake state.

Now, description will be given of test torque X and the critical test torque Xd.

Figure 2:
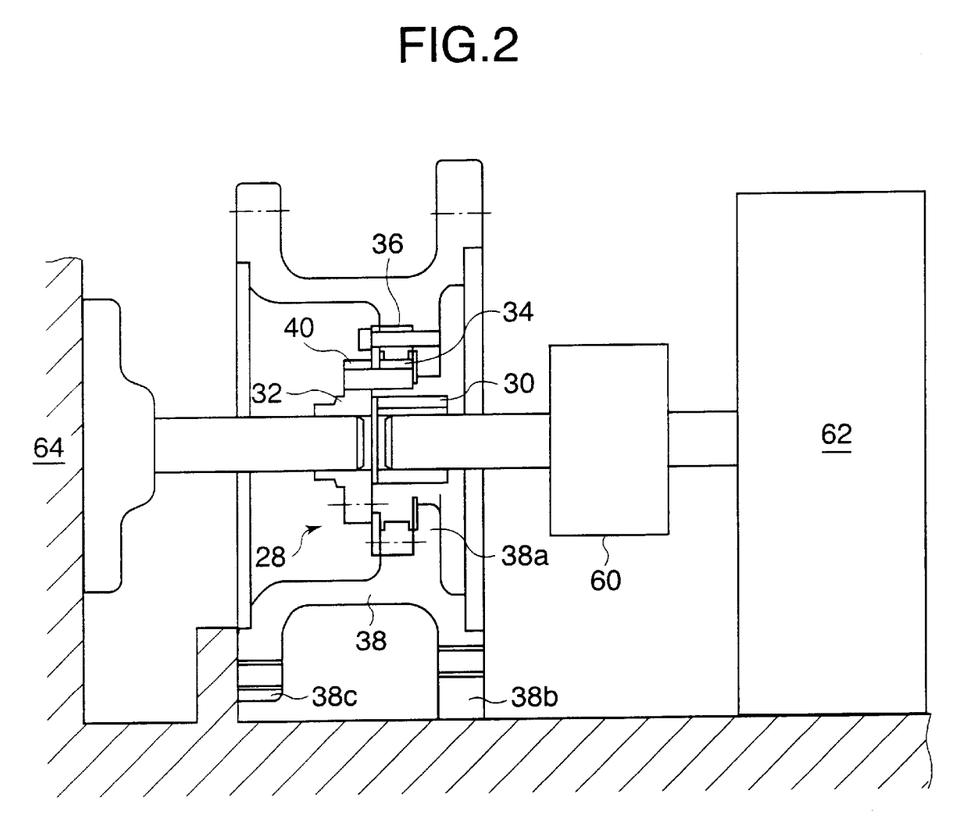
FIG. 2 is a schematic diagram showing a condition where a simple planetary roller mechanism in the frictional transmission apparatus is measured for critical test torque.

As schematically shown in FIG. 2, the sun roller 30 is coupled with a torque generator 62 (can generate rotational power) via a torque meter 60. Meanwhile, the carrier 32 is coupled to a stationary member 64 for restriction in rotation. Here, the ring roller 36 is also fixed to the stationary member 64 through the casing 38.

Figure 3:
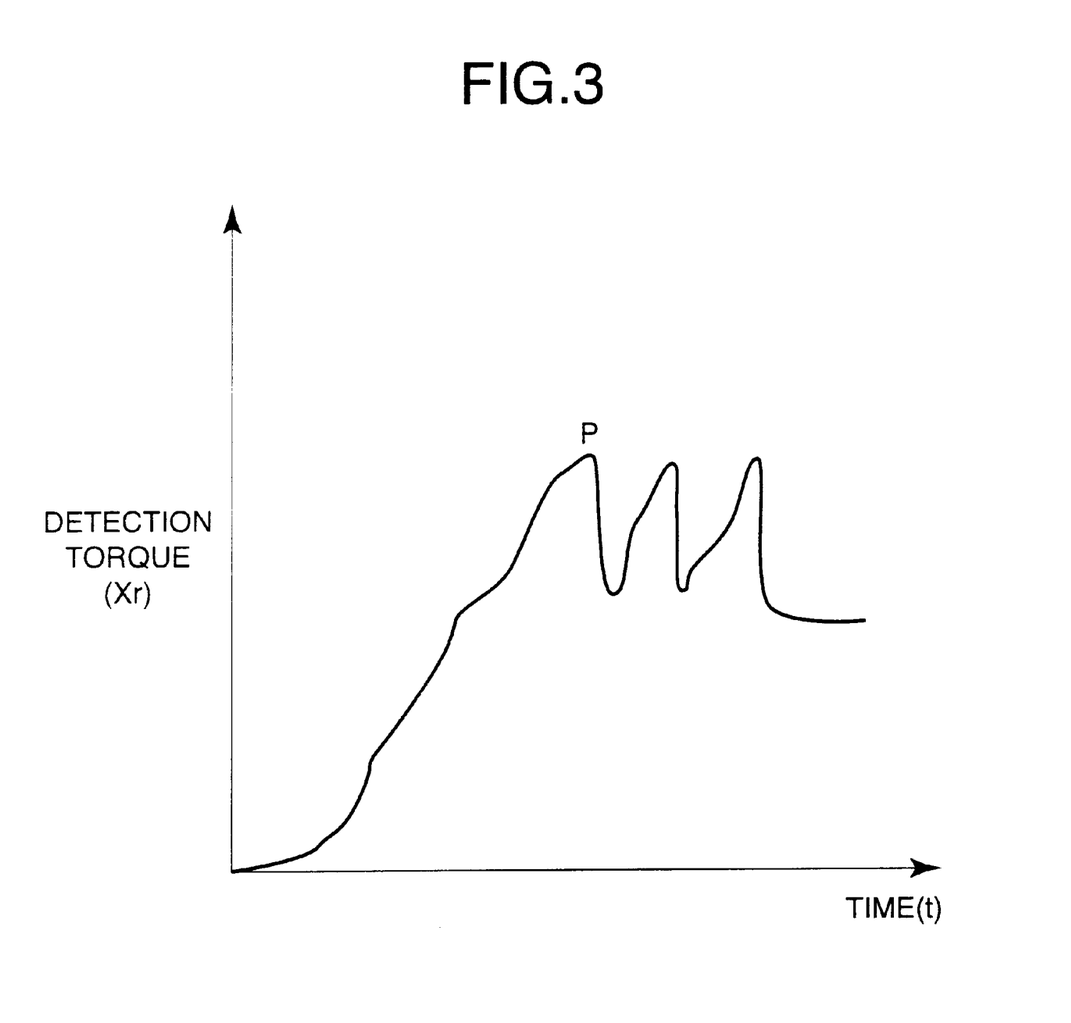
FIG. 3 is a schematic diagram showing the detection torque data in the measurement.

In this state, the torque generator 62 inputs torque to the sun roller 30 in gradually increasing values. What is referred to as "test torque X" in the present invention is this gradually-increasing input torque. It follows that the frictional forces on the respective contact surfaces of the friction rollers cause reaction torque Xo on the part of the simple planetary roller mechanism 28. Detection torque Xr detected by the torque meter 60 also follows to increase gradually (X=Xo=Xr). Nevertheless, when the reaction torque Xo produced by the frictional forces reaches its limit, one of the friction rollers starts to make sliding rotations. Here, even if the test torque X is increased further, the slide lowers the reaction torque Xo sharply so that the detection torque Xr detected by the torque meter 60 also drops suddenly. In accordance with the above-described data (see FIG. 3) obtained by the torque meter 60, the value of the test torque X (coincides with the detection torque Xr) applied upon the sudden drop of the detection torque Xr is defined as "critical test torque Xd."

This critical test torque Xd is the maximum torque the simple planetary roller mechanism 28 can hold an external load with, converted into a torque value in terms of the sun roller 30. In other words, the critical test torque Xd is the maximum power this simple planetary roller mechanism 28 can bear when rotating an external load coupled to the carrier 32 with the sun roller 30 fixed stationary, the maximum power converted into a numeric value on the part of the sun roller 30.

According to this frictional transmission apparatus 20, as described above, the brake mechanism 22 is set for braking capability (obtainable static friction torque) Y below 0.7 times the critical test torque Xd. Thus, there hardly occur such situations that the brake mechanism 22 exerts so high braking capability as to develop a tendency of hard braking, or the inertial force from a mating machine (load) becomes so great as to cause a slip in the frictional transmission apparatus. This has been confirmed by many performance check tests.

According to this frictional transmission apparatus 20, the brake mechanism 22 is also set for braking capability Y above 0.1 times the critical test torque Xd. Again, there hardly occur such situations that the brake mechanism 22 exerts too low braking capability to brake a drive source or a mating machine (load). This has also been confirmed by many performance check texts.

In short, the transmission capability of the simple planetary roller mechanism 28 and the braking characteristics of the brake mechanism 22 are set in the best balance. This means a frictional transmission apparatus excellent both in transmission efficiency and in braking capability, and high in cost performance.

Note that the range is preferably $0.2Xd<Y<0.5Xd$, and best Y=0.25Xd to 0.35Xd or so.

By the way, in the frictional transmission apparatus 20 according to the present embodiment, the transmission capability of the simple planetary roller mechanism 28 and the braking characteristics of the brake mechanism 22 are set in the best balance. Therefore, the power to be transmitted by this frictional transmission apparatus 20 (the capacity of a rotational driving apparatus, the load of a mating machine, and the like) can be set with reference to this brake mechanism 22, so as to prevent slip production in the simple planetary roller mechanism 28.

Figure 4:
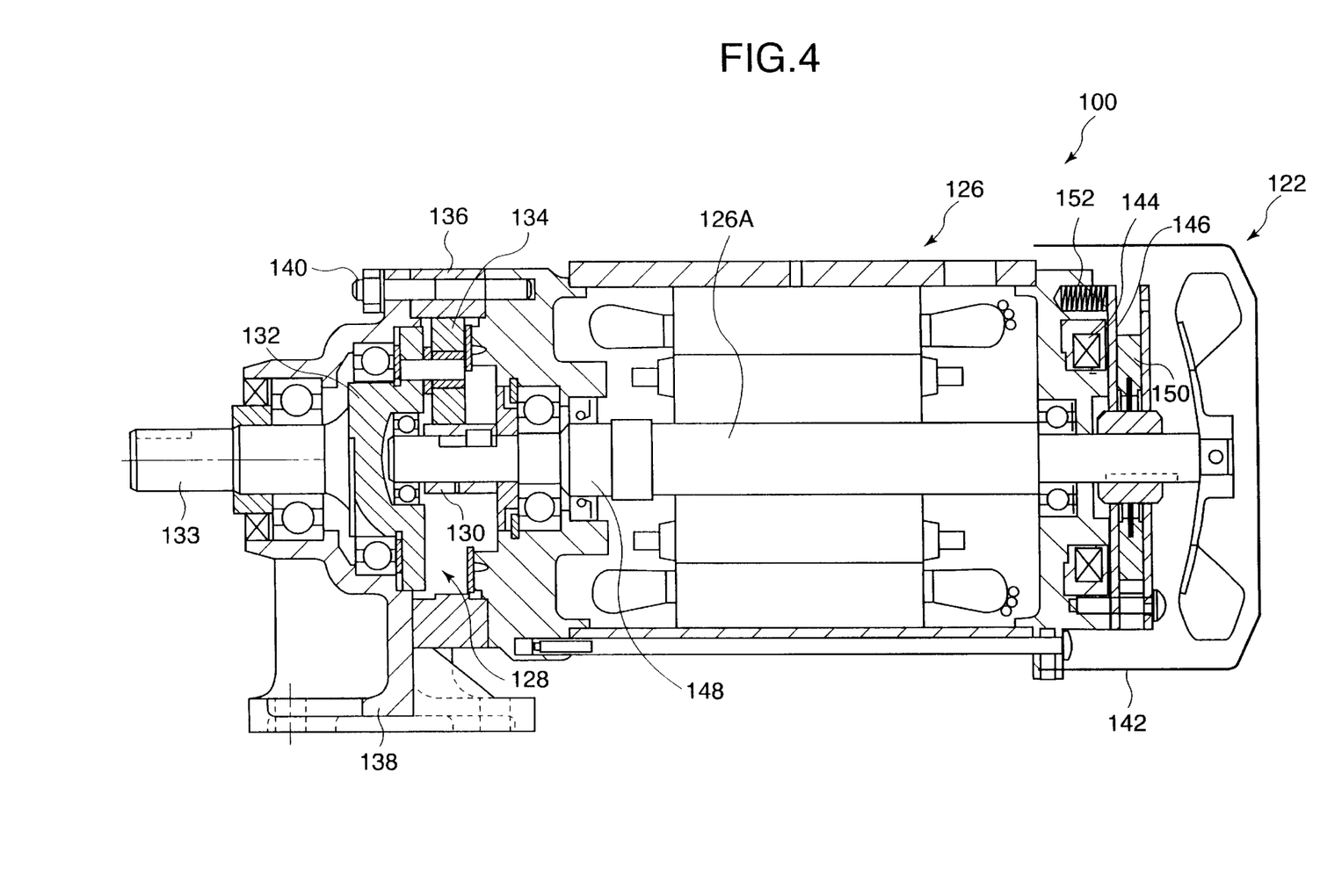
FIG. 4 is a partial sectional view of a frictional transmission type rotational driving apparatus according to a second embodiment of the present invention.

Referring to FIG. 4, description will now be given in detail of a frictional transmission type rotational driving apparatus 100 based on this concept, according to a second embodiment of the present invention.

This rotational driving apparatus 100 comprises a frictional transmission apparatus 120 consisting of a simple planetary roller mechanism 128 and a brake mechanism 122, and a motor 126 having its motor shaft consisting of a coupling shaft 148 in the frictional transmission apparatus 120. The motor 126 is installed around the coupling shaft (motor shaft) 148 so that rotational power from this motor 126 is transmitted to the coupling shaft 148.

Specifically, the coupling shaft 148 employed therein is axially longer than the coupling shaft 48 in the frictional transmission apparatus 20 described in the first embodiment. The motor 126 having this coupling shaft 148 as its motor shaft is built around the coupling shaft 148, in between the simple planetary roller mechanism 128 and the brake mechanism 122.

Besides, a casing 138 of the simple planetary roller mechanism 128 has a two-piece structure so as to sandwich a ring roller 136 therebetween. In other words, the ring roller 136 forms a part of the casing 138. An output shaft 133 is projected from the axial center of a carrier 132, so as to be connectable to a mating machine (a machine to be driven) via a coupling or the like.

A motor casing 126A of the motor 126 is connected at one end to a casing 144 of the brake mechanism 122, and at the other end to the casing 138 of the simple planetary roller mechanism 128. Here, the remaining constitution of the frictional transmission apparatus 120 is almost the same as that of the frictional transmission apparatus 20 already shown in the first embodiment. Accordingly, identical or similar parts will be designated by reference numerals having the same lower two digits as those in the frictional transmission apparatus 20. Constitutional, operational, and other detailed descriptions thereof will be omitted.

Here, the rated torque P of this motor 126 is set at 1/1.5 of the braking capability (static friction torque) Y of the brake mechanism 122. Therefore, given that the braking capability Y is set at 0.3 times the critical text torque Xd as in the foregoing embodiment, the rated torque P is set at 1/1.5 of the same, i.e., 0.3/1.5=0.2 times the critical test torque Xd.

There is little doubt that these values (relation values) mean the best mode for a frictional transmission type rotational driving apparatus with a brake mechanism. Many practical loads can be connected to this apparatus for most efficient exertion of preferable driving characteristics and braking characteristics.

Accordingly, satisfying these values while fabricating a plurality of frictional transmission type rotational driving apparatuses with brake mechanisms, differing from each other in transmission capacity and speed change ratio can provide a series of frictional transmission type rotational driving apparatuses with brake mechanisms, each model of which has necessary and sufficient driving characteristics and braking characteristics.

In some frictional transmission apparatuses, as mentioned above, original transmission torque design and transmission torque obtained from actual products can differ from each other. On this point, according to the present invention, the actually-obtained transmission torque can be easily confirmed by applying test torque to the actual products. This belongs to the category of verification testing to see whether the products fall within predetermined tolerances or not, being different from the category of trial-and-error determination of the predetermined tolerances themselves.

Now, when fabricating this frictional transmission apparatus 20 in view of the second aspect of the present invention, the squeezing force from the ring roller 36 is set so that the measurement of the critical test torque falls within 1.4–10.0 times the braking torque of the brake mechanism 22. Here, the range of 2.0–5.0 times is more favorable. The best is on the order of 3.3 times.

This "squeezing force" is typically controlled by selecting an optimum ring roller 36 from among those having various inside diameters or by grinding the inner periphery of a ring roller 36 for interference adjustment. Nevertheless, the squeezing force may also be controlled by adjusting the diameters (curvatures) and widths of the individual friction rollers to make a change in contact area so that their contact surfaces are elastically deformed by the pressures acting thereon. In summary, the above-mentioned means for adjusting the squeezing force utilize the elastic deformation of the roller material. Therefore, the "squeezing force" may be set by changing Young's modulus for the material (i.e., changing the material itself).

In such a manner, the squeezing force from the ring roller 36 is changed to make a new measurement for the critical test torque. The modification to the squeezing force is repeated until the measurement falls within the range described above. Here, when the critical test torque is too high, the squeezing force is set to smaller values. In contrast, when the critical test torque is too low, the squeezing force is set to greater values. In either case, the repetition can surely bring the critical test torque into the above-described range.

Incidentally, once the squeezing force is settled actually and confirmed to fall within the above-described range even in the presence of in-process variations, then simple planetary roller mechanisms 28 having the same squeezing force can be mass-produced. The transmission capability can be maintained nearly constant if only the critical test torque is measured, e.g., at every several products for confirmation. Such mass-production accompanied with the confirmation that the above-described range can be secured even in the presence of in-process variations is equivalent to one-by-one fabrication according to (based on) the fabrication method of the present invention.

Finally, a simple planetary roller mechanism 28 fabricated thus and a brake mechanism 22 are combined to complete the frictional transmission apparatus 20 shown in FIG. 1.

According to the above-described method of fabricating a frictional transmission apparatus 20, it is possible to put the frictional transmission apparatus 20 with ensured braking capability into mass production, allowing a large reduction on the fabrication costs.

Moreover, according to this frictional transmission apparatus 20, the transmission capability of the simple planetary roller mechanism 28 is set optimally with respect to the braking capability of the brake mechanism 22. Therefore, the power to be transmitted by the frictional transmission apparatus 20 (for example, the power of a rotational driving apparatus, the load of a.mating machine) can be set with reference to this brake mechanism 22, so as to prevent slip production in the simple planetary roller mechanism 28 as well as to avoid an increase in costs and a drop in durability.

In short, the transmission capability of the simple planetary roller mechanism 28 and the braking characteristics of the brake mechanism 22 are set in the best balance. This means a frictional transmission apparatus excellent both in transmission efficiency and in braking capability, and high in cost performance.

Now, an embodiment according to the third aspect of the present invention will be described in detail.

Returning to FIG. 4, this rotational driving apparatus 100 is provided with the brake mechanism 122. Here, Y<Xd is satisfied, where Y is static friction torque obtainable from this brake mechanism, and Xd is the critical test torque of the simple planetary roller mechanism 128. Moreover, 0.65Ys<Xs<3.4Ys is satisfied, where Ys is dynamic friction toque obtainable from the brake mechanism 122 at a rated revolution speed of the motor 126, and Xs is limit transmission torque (to be detailed later) of the simple planetary roller mechanisms 128 with the sun roller 130 rotated at the rated revolution speed.

Here, the limit transmission torque Xs is preferably set within the range of 0.8Ys<Xs<1.7Ys. The rated toque Ts of the motor 126 and the limit transmission torque Xs are set as T<Xs. These values are based on the findings from the present inventors fabricating a variety of prototypes and actually subjecting the same to applicability tests on various scenes.

Now, description will be given of the "critical test torque Xd" and the "limit transmission torque Xs."

Figure 5:
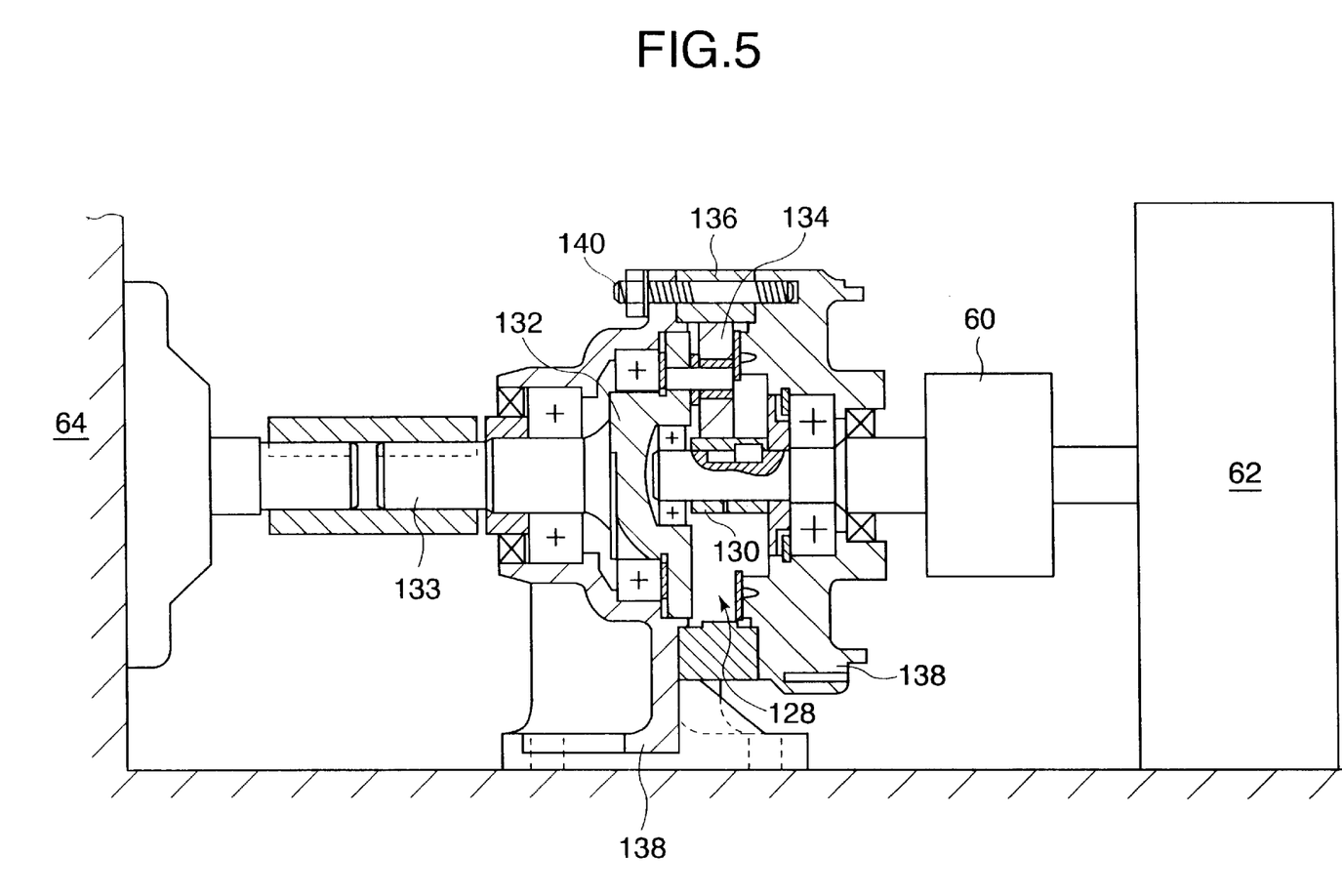
FIG. 5 is a schematic diagram showing another condition where a simple planetary roller mechanism in the rotational driving apparatus according to the present invention is measured for critical test torque.

FIG. 5 shows another configuration for measuring critical test torque Xd. The sun roller 130 is coupled with a torque generator 62 (can-generate rotational power) via a torque meter 60. Meanwhile, the carrier 132 is coupled to a stationary member 64 for complete restriction in rotation. The ring roller 136 is also fixed to the stationary member 64 via the casing 138. In terms of the basic skeleton, this configuration is identical to the foregoing one in FIG. 2, and the critical test torque Xd can be measured by the same method as that previously described in conjunction with FIG. 2. Therefore, like parts in the diagram will be designated by reference numerals having the same lower two digits, and repetitive description thereof will be omitted.

Figure 6:
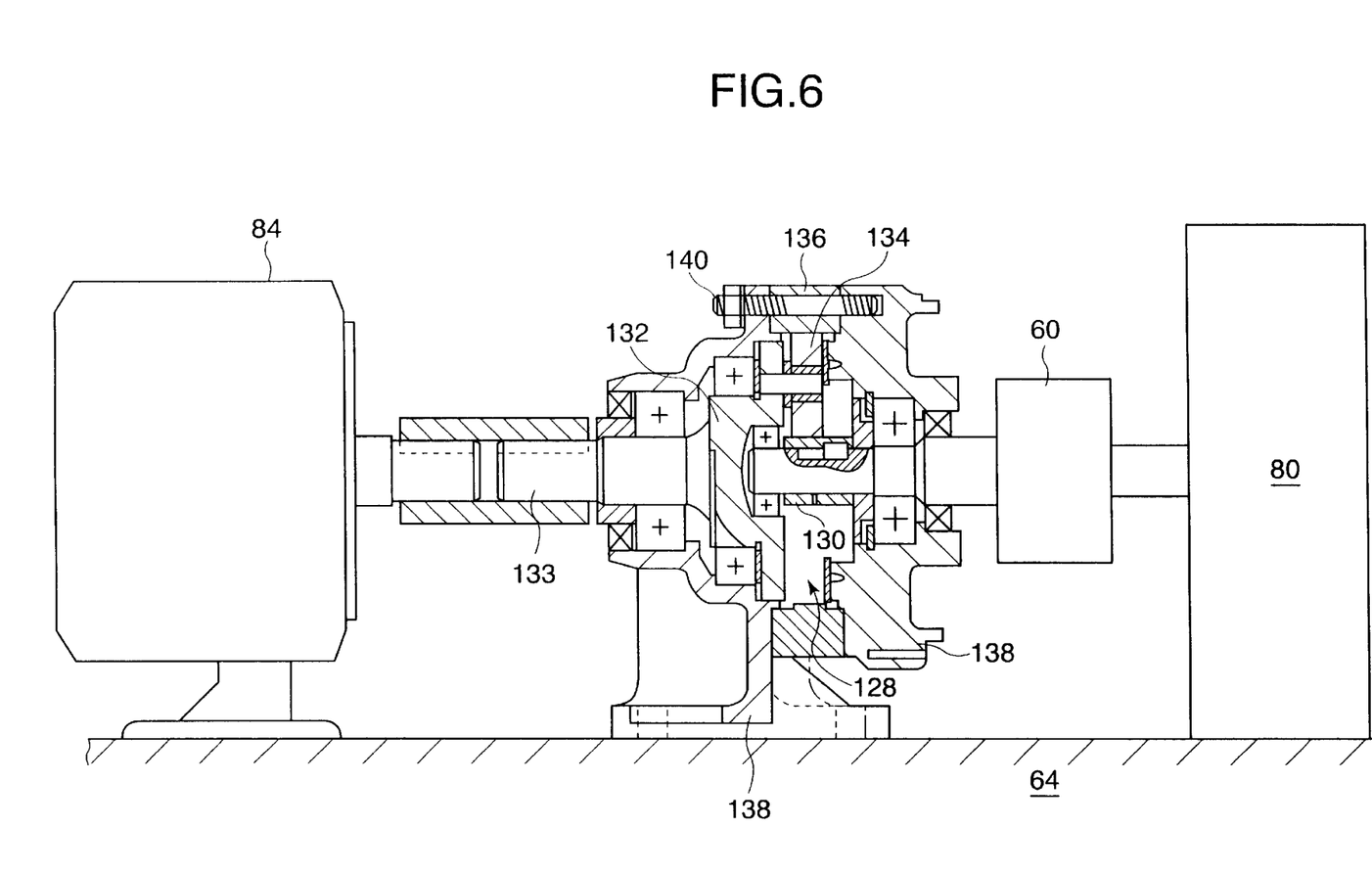
FIG. 6 is a schematic diagrams showing a condition where the simple planetary roller mechanism in the rotational driving apparatus is measured for limit transmission torque.

Next, description will be given of the limit transmission torque Xs of the simple planetary roller mechanism 128 with reference to FIG. 6.

To measure the limit transmission torque Xs, the sun roller 130 is coupled with a load generator 80 (can generate a rotational load) via the torque meter 60. Meanwhile, the carrier 132 is coupled via a coupling to a motor shaft 84A of a test motor 84 that is fixed to the stationary member (base member) 64. The ring roller 136 is also coupled to the stationary member 64 via the casing 138.

Initially, with no rotational load generated by the load generator 80, the test motor 84 rotates the carrier 132 to rotate the sun roller 130 at the rated revolution speed of a to-be-coupled motor 126 (see FIG. 4).

Figure 7:
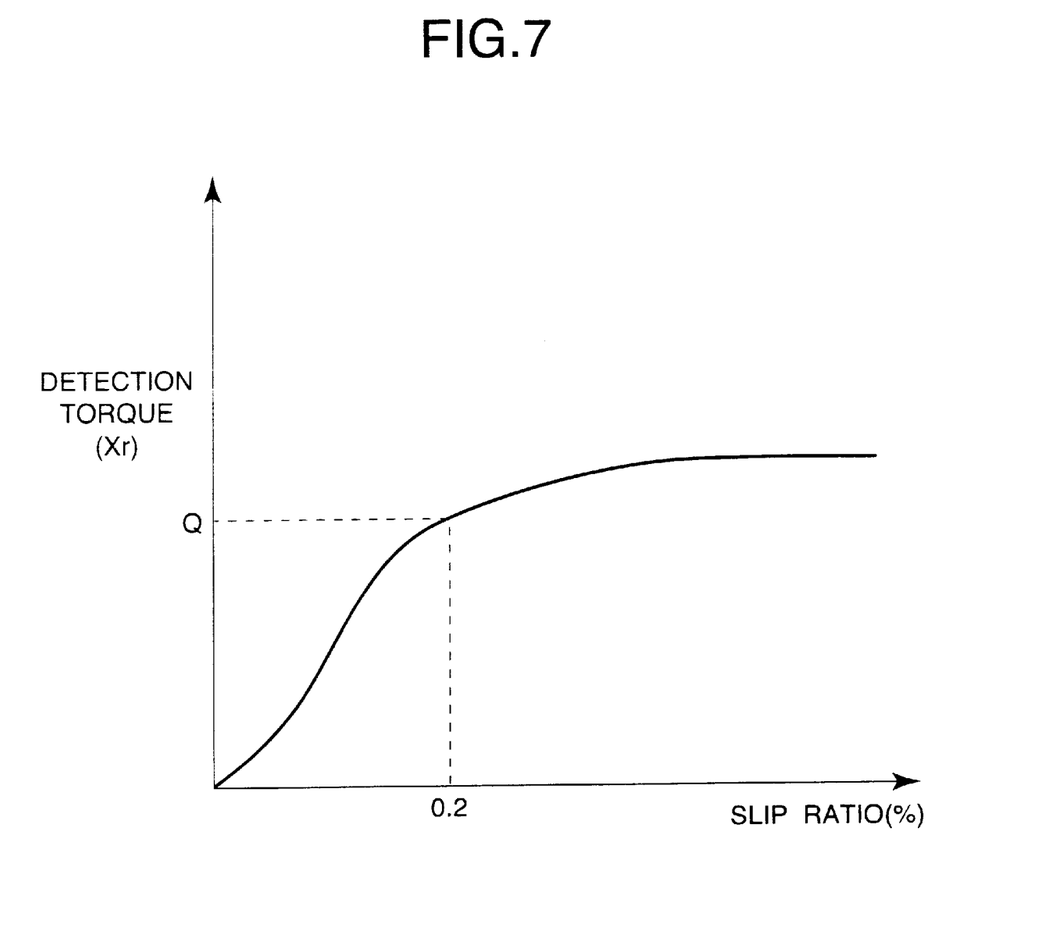
FIG. 7 is a schematic diagram showing the detection torque data in that measurement.

This test motor 84 has driving torque sufficiently higher than the torque the simple planetary roller mechanism 128 to be measured here can transmit and the braking torque from the brake mechanism 122. The test motor 84 thus has driving power enough to keep rotating the sun roller 130 at a predetermined revolution speed (the rated revolution speed of the to-be-coupled motor 126) even when some load variations exist on the sun-roller side. In this state, the load generator (braking torque generator) 80 inputs a rotational load (load torque Xn1) to the sun roller 130 in gradually increasing values. Since the test motor 84 maintains the constant rotation irrespective of the load increases, the sun roller 130 receives reaction torque Xo1 equivalent to the load torque Xn1-applied from the part of the load generator 80. The result is that detection torque Xr1 is detected by the torque meter 60 (Xn1=Xo1=Xr1). The increasing load torque Xn1 accompanies the detection torque Xr1 to increase. Nevertheless, when the load torque Xn1 input from the load generator 80 is kept on the increase, the reaction torque Xo1 comes to fail to follow the rising load torque Xn1 because of slips between the friction rollers. This produces greater slippage so that the acceptable limit of the slip ratio for the products (approximately 0.2%) is reached (see FIG. 7). Consequently, the detection torque value Xr1 detected by the torque meter 60 upon reaching the limit (corresponding to the point Q in FIG. 7) is the "limit transmission torque Xs."

Incidentally, while the present embodiment deals with the case where the carrier 132 makes the output element, the output element may be made out of the ring roller. In such a case, this ring roller is coupled to the test motor 84 for the same measurements.

The limit transmission torque Xs represents the value of an allowable torque limit up to which the simple planetary roller mechanism 128 can drive an external load from its mating machine when driven by the to-be-coupled motor 126 to rotate at the rated speed. To put it in terms of braking a mating machine, the limit transmission torque Xs is the allowable limit value of the braking capability (torque) the simple planetary roller mechanism 128 can transmit to the mating-machine side when the sun roller 130 is rotated at the rated speed.

In this rotational driving apparatus, the critical test torque Xd and limit transmission torque Xs measured thus, and the static friction torque Y and dynamic friction torque Ys of the brake mechanism are set as described above. Therefore, the simple planetary roller mechanism 128 is optimized in magnitude (transmission capability) with respect to the brake mechanism 122, so that the basic function of "stopping a mating machine with reliability at the end" is exercised sufficiently.

In the braking at revolutions, a slip may possibly occur between the individual friction rollers of the simple planetary roller mechanism 128. Nevertheless, the braking torque (dynamic friction torque) from the brake mechanism 122 can be transmitted to the mating-machine side with reliability (as far as the simple planetary roller mechanism 128 can transmit) to reduce the revolution speed of the mating machine. This state lasts until the mating machine gradually decreases in revolution speed. This involves a rise in the limit transmission torque of the simple planetary roller mechanism 128 (already experimented and verified by the present inventors), whereby the braking torque from the brake mechanism can be transmitted with higher reliability to finally stop the mating machine without fail.

Once the mating machine is stopped, the retention torque (test torque value Xd) in the simple planetary roller mechanism 128 exceeds the braking torque (static friction torque Y) from the brake mechanism 122. This precludes the simple planetary roller mechanism 128 from starting to slip before the brake mechanism 122, thereby allowing sufficient retention of the mating machine.

Meanwhile, in terms of the general balance in power between the motor 126 and the brake mechanism 122, this rotational apparatus has the simple planetary roller mechanism 128 optimized to the motor 126 in magnitude (transmission capability) as is evident from the relation between the limit transmission torque Xs and the dynamic friction torque Ys. That is, the simple planetary roller mechanism 128 is never too large. Therefore, the rotational power from the motor 126 can be transmitted to the mating-machine side with high efficiency.

As a consequence, the conflicting requirements of the simple planetary roller mechanism 128, namely, for braking characteristics and transmission efficiency are kept in optimum balance, meaning a rotational driving apparatus excellent in overall cost performance.

In the example described above the limit transmission torque Xs of the simple planetary roller mechanism and the rated torque T of the motor are set as T<Xs, whereas they are more favorably set as T<0.8Xs and best as T≈0.6Xs.

The above embodiment has dealt with the cases where the brake mechanism is provided at the rear end of the motor. Nevertheless, the present invention is not limited thereto, and also covers the cases where the brake mechanism is interposed between the simple planetary roller mechanism and the motor. The structure of the brake mechanism is not limited to the above-described disc type, neither. For example, a drum type brake mechanism for radially pressing a brake shoe against a brake ring may be used. Besides, a hydraulic, mechanical, air-pressure, or other system may be adopted for the ON/OFF switching.

Moreover, while this embodiment has dealt with the rotational driving apparatus having a simple planetary roller mechanism, a motor, and a brake mechanism in combination, additional reduction gears or the like may be arranged thereto as far as the spirit of the present invention is applicable.

Furthermore, the present invention covers not only the cases where the brake mechanism is directly coupled to the sun roller in the simple planetary roller mechanism, but also such cases that a motor is interposed therebetween and that the brake mechanism is indirectly coupled via reduction gears. In these cases, the static friction torque of the brake mechanism should be converted into a sun-roller-side value for use.

According to the present invention, a simple planetary roller mechanism and a brake mechanism can be brought into balance to obtain a frictional transmission apparatus with sure braking capability while reducing costs thereof. Besides, a motor can be built into this frictional transmission apparatus to obtain a high-efficiency rotational driving apparatus of frictional transmission type. In addition, a fabrication method can be obtained through which a frictional transmission apparatus having the effects as described above can be fabricated with reliability.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A frictional transmission apparatus comprising a simple planetary roller mechanism and a brake mechanism, said simple planetary roller mechanism having friction rollers including a sun roller, a planetary roller, and a ring roller, said planetary roller being retained by a carrier and making rolling contact with the outer periphery of said sun roller and with the inner periphery of said ring roller, said brake mechanism being coupled to said sun roller to brake rotation of said sun roller, wherein static friction torque Y obtainable from said brake mechanism is set to fall within the range of $$0.1Xd < Y < 0.7Xd,$$

where Xd is critical test torque, a value of test torque at which any of said friction rollers starts to make sliding rotation when said test torque is input in gradually increasing values to said sun roller with said carrier and said ring roller fixed stationary.

2. A frictional transmission type rotational driving apparatus comprising a simple planetary roller mechanism and a brake mechanism, wherein:

a motor having a motor shaft consisting of a coupling shaft for coupling said sun roller and said brake mechanism in said frictional transmission apparatus according to claim 1 is installed around said coupling shaft; and rotational power from said motor is transmitted to said coupling shaft.

3. A series of frictional transmission type rotational driving apparatuses, comprising a plurality of frictional transmission type rotational driving apparatuses according to claim 2, differing from each other in transmission capacity and in speed change ratio.

4. A method of fabricating said frictional transmission apparatus comprising a simple planetary roller mechanism and a brake mechanism according to claim 1, said method comprising the steps of:

inputting test torque in gradually increasing values to said sun roller with said carrier and said ring roller fixed stationary, and measuring critical test torque Xd, a value of said test torque at which any of said friction rollers starts to make sliding rotation; and setting and fabricating a braking part of said brake mechanism so that said static friction torque Y of said brake mechanism falls within the range of $$0.1Xd < Y < 0.7Xd$$

with respect to said critical test torque Xd measured.

5. A method of fabricating a frictional transmission apparatus comprising: a simple planetary roller mechanism having friction rollers including a sun roller, a planetary roller, and a ring roller, said planetary roller being retained by a carrier and making rolling contact with the outer periphery of said sun roller and with the inner periphery of said ring roller, said ring roller applying a squeezing force to said planetary roller and said sun roller; and a brake mechanism coupled to said sun roller to brake rotation of said sun roller, said method comprising the step of setting said squeezing force from said ring roller so that critical test torque falls within the range of 1.4–10.0 times static friction torque obtainable from said brake mechanism, where said critical test torque is a measurement of test torque at which any of said friction rollers starts to make sliding rotation when said test torque is input in gradually increasing values to said sun roller with said carrier and said ring roller fixed stationary.

6. A frictional transmission type rotational driving apparatus comprising a simple planetary roller mechanism and a motor, said simple planetary roller mechanism having friction rollers including a sun roller, a planetary roller, and a ring roller, said planetary roller being retained by a carrier and making rolling contact with the outer periphery of said sun roller and with the inner periphery of said ring roller, said motor being coupled to said sun roller to drive said sun roller, wherein:

a brake mechanism is added to said motor;

$$Y < Xd \text{ holds,}$$

where Y is static friction torque obtainable from said brake mechanism and Xd is a value of test torque at which any of said friction rollers starts to make sliding rotation when said test torque is input in gradually increasing values to said sun roller with said carrier and said ring roller fixed stationary; and $0.65 Y_s < X_s < 3.4 Y_s$ holds, where Ys is dynamic friction torque obtainable from said brake mechanism at a rated revolution speed of said motor, and Xs is limit transmission torque transmittable by said simple planetary roller mechanism through said sun roller when said sun roller is rotated at said rated revolution speed.

7. The frictional transmission type rotational driving mechanism according to claim 6, wherein $T < X_s$ holds, where Xs is said limit transmission torque of said simple planetary roller mechanism, and T is rated torque of said motor.

* * * * *